No. 844,444. PATENTED FEB. 19, 1907.
L. B. FARMER.
GEARING MECHANISM FOR MOTOR VEHICLES.
APPLICATION FILED MAR. 3, 1906.
2 SHEETS—SHEET 1.
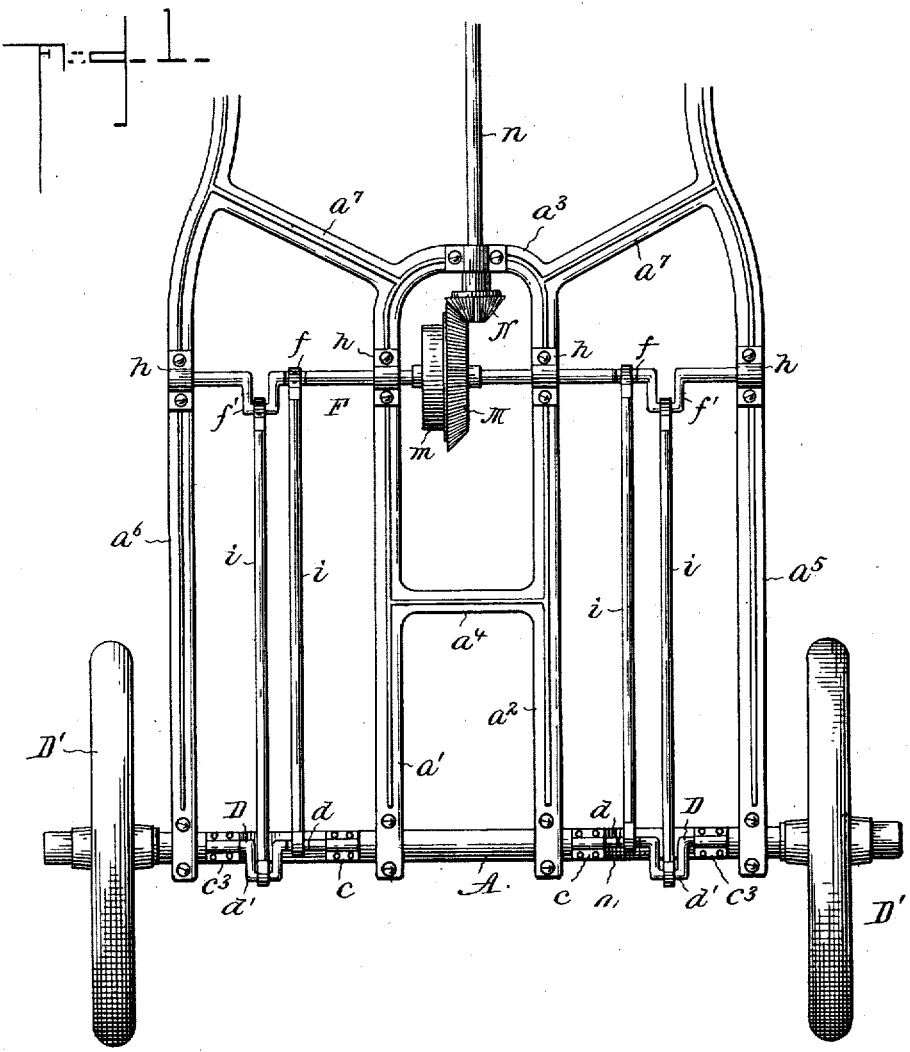
Witnesses:
R. J. Beall
S. E. Thomas.
Leslie Boyd Farmer,
Inventor,
by John Thomas & Co.
Attorneys.

No. 844,444. PATENTED FEB. 19, 1907.
L. B. FARMER.
GEARING MECHANISM FOR MOTOR VEHICLES.
APPLICATION FILED MAR. 3, 1906.
2 SHEETS—SHEET 2.
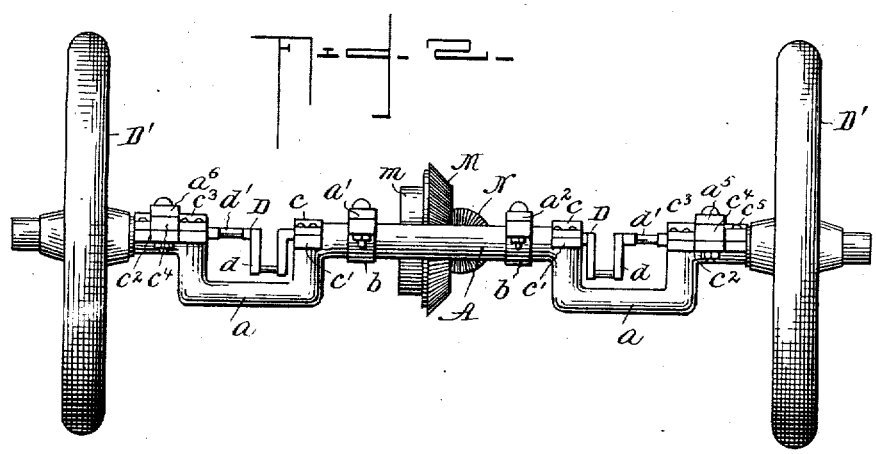
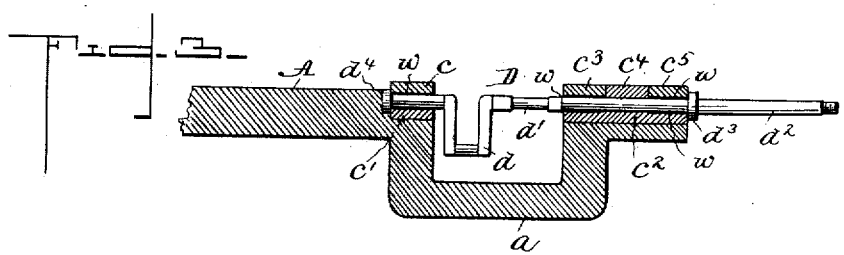
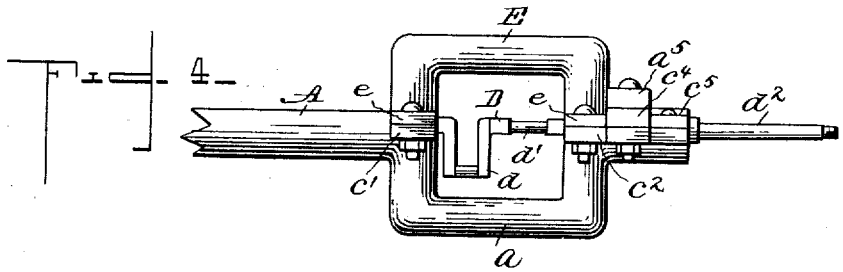
Witnesses:
R. J. Beall
S. E. Thomas
Leslie Boyd Farmer,
Inventor,
by John B. Thomas & Co.
Attorneys.

UNITED STATES PATENT OFFICE.

LESLIE B. FARMER, OF SOUTH ORANGE, NEW JERSEY.

GEARING MECHANISM FOR MOTOR-VEHICLES.

No. 844,444.        Specification of Letters Patent.        Patented Feb. 19, 1907.

Application filed March 3, 1906. Serial No. 304,001.

*To all whom it may concern:*

Be it known that I, LESLIE BOYD FARMER, a citizen of the United States, residing at South Orange, in the county of Essex and State of New Jersey, have invented a Gearing Mechanism for Motor-Vehicles, of which the following is a full and complete specification.

This invention is an improvement in motor-vehicles of the class commonly known as "automobiles," and relates more especially to the provision of improved gearing mechanism between the motor and driving-wheels.

The objects of the invention are to provide a connection between a counter-shaft and the driving-axles of a motor-vehicle or automobile which shall be light in construction, effective in operation, strong and durable, and which shall transmit the power evenly and positively under the varying conditions in which such vehicles are used.

The invention consists in the peculiar construction and arrangement of the parts constituting the improved gearing in connection with the form of supporting-frame therefor, all as hereinafter particularly described, and specifically set forth in the appended claims.

In the accompanying drawings, Figure 1 is a plan view of my improved gearing mechanism for motor-vehicles or automobiles, showing so much of the supporting-frame or running-gear as is necessary to the application of the invention. Fig. 2 is a rear elevation. Fig. 3 is an enlarged sectional view through one end of the axle, showing the manner of connecting the driving shafts or axles. Fig. 4 is a detail illustrating a modification hereinafter referred to. Fig. 5 is a vertical sectional view through Fig. 4.

Like letters and numerals of reference indicate like parts in all the figures of the drawings.

In carrying out my invention the gearing mechanism hereinafter described is supported in a frame comprising a rear transverse bar or axle A, which is provided near its opposite ends with downwardly-extending loops $a$, and at opposite sides of the latter the axle is cut away at its upper side (see Fig. 3) to receive the bearing-boxes, in which are journaled the cranked driving shafts or axles hereinafter referred to. The axle A is preferably made solid and of the required size to support the load it is intended to carry.

Between the loops of the axle A and upon the latter there are secured, by means of clips $b$, two reach-bars $a'$ and $a^2$, which extend forwardly and merge in a loop portion $a^3$, said reach-bars being braced intermediately by a cross-bar $a^4$. At the outer ends of the axle A are secured reach-bars $a^5$ and $a^6$, which also extend forwardly and are connected to the loop portion of the aforesaid reach-bars by means of diagonal bars $a^7$. These reach-bars in conjunction with the connecting-bars and axle constitute the frame for supporting the gearing mechanism and being constructed in the manner shown forms a light and strong support.

Secured at the inner side of each loop portion $a$ of the axle A are the upper and lower sections $c$ and $c'$, respectively, of a bearing-box which supports one end of a cranked shaft or axle D, the latter being supported at the opposite side of said loop portion by means of a lower bearing-box section $c^2$ in conjunction with the upper sections $c^3$, $c^4$, and $c^5$, the intermediate section $c^4$ forming a seat for one of the reach-bars $a^5$ or $a^6$, while the end sections $c^3$ and $c^5$ are removable and contain Babbitt metal, as $w$, Fig. 3, the box $c$ $c'$ also being provided with Babbitt metal to provide the bearing-surfaces for the shafts D. These bearings are lubricated in any approved manner.

The lower bearing-box sections $c'$ and $c^2$ are secured to the axle A by means of screws $s$, Fig. 5, while the upper sections are all secured to said lower sections by means of bolts and nuts, as shown.

Each driving shaft or axle D is provided with two cranks $d$ and $d'$, disposed at right angles to each other, and the shaft is extended beyond the end of the axle, where it is formed into a spindle $d^2$ to receive the wheel D', which is attached to said spindle, so as to rotate with the shaft. The shaft or axle D is provided with a collar $d^3$ at the end of the axle and with a similar collar $d^4$ at the inner end of said shaft, said collars holding the shaft against end thrust. The cranks of the shafts or axles D turn in the loop portions $a$ of the axle A, and in order to reinforce the latter at said loops removable loops E, corresponding with the loops $a$, may be provided, (see Fig. 4,) in which instance the ends of said loops E take the place of the bearing-box sections $c$ and $c^3$, for which purpose said ends are flanged laterally, as at $e$, so that they may be bolted to the lower bearing-box sections. (See Fig. 5.)

Extending transversely of the supporting-frame and parallel with the crank shafts or axles D D is a counter-shaft F, said counter-shaft being supported on the reach-bars $a'$, $a^2$, $a^5$, and $a^6$ in boxes $h$, bolted thereon. The counter-shaft is provided with cranks $f$ and $f''$ on a line with the corresponding companion cranks $d$ and $d'$ on the crank-shafts D and disposed with relation thereto that when connected by the rods $i$ the operation of the counter-shaft will also turn the crank shafts or axles, said rods $i$ being coupled to the cranks in the usual manner. The counter-shaft is also provided with a large bevel gear-wheel M, which is in mesh with a beveled pinion N, the latter being on the rear end of a longitudinal shaft $n$, driven by any suitable motor. (Not shown.) The large bevel gear-wheel M is provided with the usual differential gears which are inclosed in the casing $m$, fastened to the rear side of the large gear-wheel M.

From the foregoing description, in connection with the accompanying drawings, it will be readily seen that I provide a gearing mechanism for motor-vehicles or automobiles which is simple in construction and will transmit the power in an effective manner, inasmuch as the double set of crank connections will evenly balance the driving-gear and insure an easy running of the vehicle under varying conditions of road, &c. The construction of bearings for the crank-shafts which carry the drive-wheels provide that said bearings may be easily and conveniently examined and repaired or renewed, if necessary.

Having thus particularly described my invention, I do not wish to be limited in my protection to the construction shown and described, as obvious changes may be made in certain details without sacrificing any of the advantages of the invention, all within the spirit and scope of my claims.

Having thus described my invention, what I claim as new, and desire to secure by Letters Patent, is—

1. In a motor-vehicle or automobile, the combination with the frame comprising the axle A and reach-bars extending forwardly therefrom, said axle having loops near the ends thereof, of the driving shafts or axles D bridging the loops of the axle A and having double cranks disposed in said loops, one end of each driving-shaft being extended beyond the end of the axle and formed into a spindle; together with a counter-shaft journaled on the reach-bars and having two pairs of cranks connected to the cranks of the driving-shafts by rods $i$, and means for turning the counter-shaft.

2. In a motor-vehicle or automobile, the combination with the frame comprising the axle A having the depending loops $a$ near its ends, of bearing-boxes disposed at opposite sides of the loops, and crank-shafts D journaled in said bearing-boxes and extended at one end beyond the axle where it is formed into a spindle to receive the wheel; together with counter-shafts supported in boxes mounted on the reach-bars and having crank portions, rods connecting the counter-shafts to the crank-shafts, a large bevel gear-wheel connected to the counter-shafts, and means for turning said bevel gear-wheel.

3. In a motor-vehicle or automobile, the combination with the frame comprising the axle A having the depending loops $a$ near its ends, parallel reach-bars extending forwardly from the axle and connected together at their forward ends; of bearing-boxes disposed at opposite sides of the loops, the bearing-box at the outer end of the axle comprising a lower section and three upper sections, the intermediate upper section forming a seat for the outer reach-bars, crank-shafts supported in said bearing-boxes and extended beyond the end of the axle where they are formed into spindles to receive the driving-wheels, and a removable loop portion the ends of which form a part of the bearing-boxes, said removable loop portion being opposed to the loop portion of the axle; together with counter-shafts supported on the reach-bars and having cranks, rods connecting the counter-shafts to the driving-shafts, and a bevel gear-wheel for imparting rotation to the counter-shafts, substantially as herein shown and described.

4. In a motor-vehicle or automobile, the combination, of independent crank-shafts carrying the drive-wheels, said shafts having each a double crank disposed at right angles to each other; together with counter-shafts having corresponding cranks, rods connecting the counter-shafts to the crank-shafts, and means for imparting motion to the counter-shafts, substantially as shown and described.

5. In a motor-vehicle or automobile, the combination, of separate shafts carrying the drive-wheels, said shafts each having a plurality of cranks disposed at an angle to each other, a counter-shaft having corresponding cranks, rods connecting the cranks on the counter-shaft to the companion cranks on the wheel-shafts, and means for imparting motion to the counter-shaft, substantially as shown and described.

In testimony whereof I have signed my name to this specification in the presence of two subscribing witnesses.

LESLIE B. FARMER.

Witnesses:
WM. D. BARRADALE,
LEWIS P. TAYLOR.